(No Model.)
A. W. STRAUGHN.
AUTOMATIC CORN DROPPER.
No. 368,791. Patented Aug. 23, 1887.
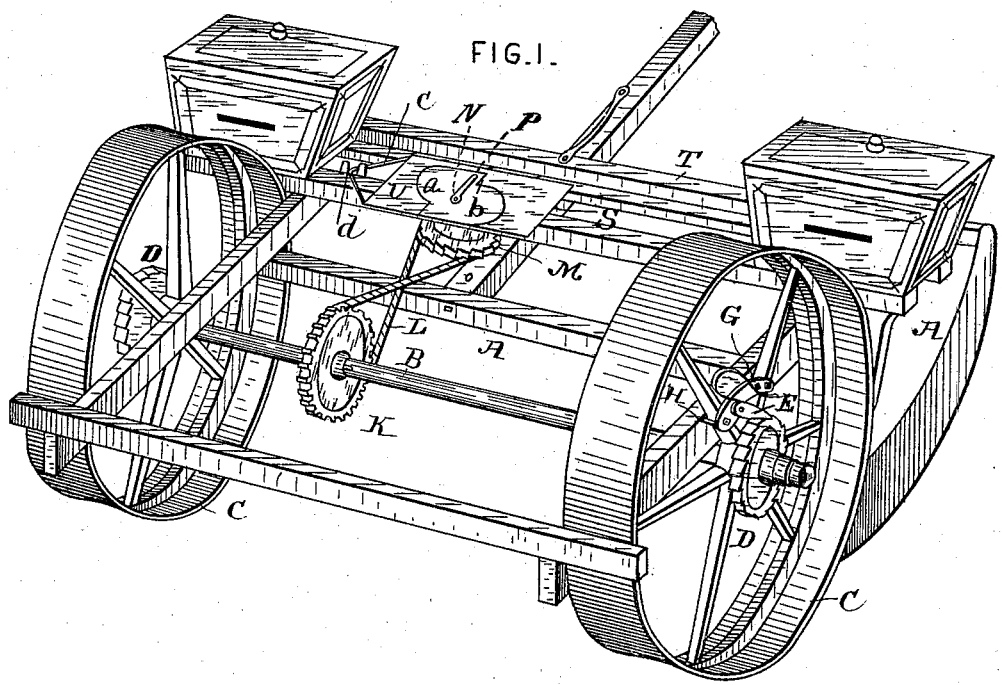
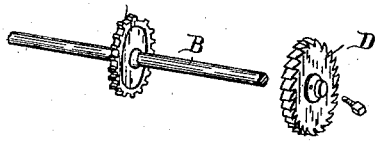
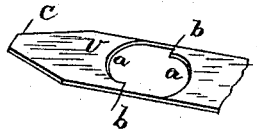
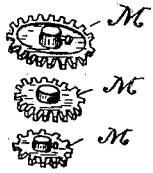
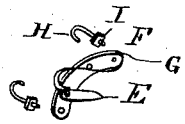
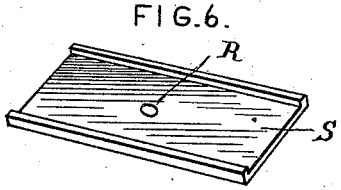
ATTEST—
Harry L. Amer
Chas. M. Werle
INVENTOR—
Alanson W. Straughn
per J. E. Duff
Attorney

UNITED STATES PATENT OFFICE.

ALANSON W. STRAUGHN, OF LINCOLNVILLE, INDIANA.

AUTOMATIC CORN-DROPPER.

SPECIFICATION forming part of Letters Patent No. 368,791, dated August 23, 1887.

Application filed June 11, 1887. Serial No. 241,037. (No model.)

*To all whom it may concern:*

Be it known that I, ALANSON W. STRAUGHN, of the town of Lincolnville, in the county of Wabash and State of Indiana, have invented certain new and useful Improvements in Automatic Corn-Droppers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in seed-planters, and it is especially designed for planting corn.

The invention has for its objects to provide improved mechanism for imparting a positive feed motion to the seed-dropping slides, so as to insure regular spacing in the seed dropped, and in certain details of construction, whereby a simple, cheap, and durable machine is produced, as more fully hereinafter specified. These objects I attain by the means illustrated in the accompanying drawings, in which—

Figure 1 represents a perspective view of my improved planter complete. Fig. 2 is a detached view of the driving-shaft and sprocket-wheel and the ratchet-wheel by which it receives motion from one of the driving-wheels. Fig. 3 is a perspective view of a vertical shaft and lever by which the cam-plate is operated. Fig. 4 represents a cam-plate, by means of which a reciprocating motion is imparted to the feed-slides. Fig. 5 represents detached perspective views of the pawl-supporting plate, its pawl and spring, and fastening devices. Fig. 6 represents a guide-plate in which the cam slides; and Fig. 7 represents a series of removable sprocket-wheels, which may be secured interchangeably to the cam-driving shaft, in order to change the throw of the feed-slides, and thus vary the spaces between the seed dropped, as more fully hereinafter set forth.

Referring the drawings, the letter A indicates the frame of the planter, which has journaled, in suitable bearings at each side, a transverse axle on shaft B, the ends of the shaft projecting at each side, where they are provided with loosely-mounted wheels C, which have concave peripheries that follow in the line of the seed dropped to hill the earth around and cover the seed.

The main shaft or axle is provided with one or more fixed ratchet-wheels, D, with which engage the pawls E at one or both ends, said pawls being pivoted to a curved supporting-plate, G, secured to the spokes of the wheel by means of the hooked bolts or clips H and the screw-nuts I in such manner as to be readily attached and detached.

The main driving-shaft B is provided with a fixed sprocket-wheel, K, over which passes a twisted sprocket-chain, that also passes around a horizontal sprocket-wheel, M, mounted on the lower end of a vertical shaft, N, having a cam-arm, P, secured to its upper end. The said shaft is journaled in a bearing, R, in the guide-plate S, which is secured to the transverse sills of the frame of the planter.

The letter U indicates a cam-plate, which is arranged to slide between the raised edges of the guide-plate S. The said plate has a central opening, the opposite side edges of which opening are curved, as indicated by the letter *a*, and shouldered at opposite sides and ends, as indicated by the letter *b*, for the purpose hereinafter explained. The said cam-plate has an extension, *c*, at one side, which engages the lugs *d* on the slide-bar, so as to give a reciprocating motion to the feed-slides. The said slides are of the ordinary or any approved construction, and hence a detailed description of the same is not necessary.

The operation of my improved planter is as follows: The parts being geared as indicated in Fig. 1, upon advancing the frame the driving-wheels will turn, and by means of the ratchet-wheels and pawls carry the main driving-shaft in the proper direction. The vertical sprocket-wheel on the main shaft will turn the horizontal sprocket-wheel, turning the vertical shaft and rotating its cam-lever. This alternately engages the shoulders *b*, carrying the cam-plate back and forth and reciprocating the feed-slides, so as to properly drop the seed. By changing the sprocket-wheels M it is evident that the throw of the slides may be changed so as to vary the spaces between the dropped seed.

Having thus described my invention, what

I claim, and desire to secure by Letters Patent, is—

1. The combination, in a corn-planter, of the main driving-shaft and vertical sprocket-wheel mounted thereon, the horizontal sprocket-wheel, its vertical shaft and cam-lever, and the reciprocating cam-plate operated thereby to move the feed-slides, substantially as specified.

2. The combination, with the main shaft and its sprocket-wheel and chain, of the vertical cam-shaft, cam-lever, cam-plate, and feed-slides, and the interchangeable sprocket-wheels, whereby the throw of the cam-plates may be varied, substantially as specified.

In testimony that I claim the foregoing as my own invention I affix my signature in presence of two witnesses.

ALANSON W. STRAUGHN.

Witnesses:
WARREN BIGLER,
JOHN H. DICKEN.